US008805290B2

(12) United States Patent
Guo et al.

(10) Patent No.: US 8,805,290 B2
(45) Date of Patent: Aug. 12, 2014

(54) METHOD AND SYSTEM FOR SPATIAL RADIO-FREQUENCY PERFORMANCE TESTING BASED ON MULTIPLE-ANTENNA SYSTEM

(75) Inventors: Yang Guo, Shenzhen (CN); Xinyu Zheng, Shenzhen (CN); Zhong Yu, Shenzhen (CN)

(73) Assignee: ZTE Corporation, Shenzhen, Guangdon Province (CN)

( * ) Notice: Subject to any disclaimer, the term of this patent is extended or adjusted under 35 U.S.C. 154(b) by 82 days.

(21) Appl. No.: 13/578,206

(22) PCT Filed: Jun. 12, 2010

(86) PCT No.: PCT/CN2010/073908
§ 371 (c)(1),
(2), (4) Date: Aug. 9, 2012

(87) PCT Pub. No.: WO2011/097854
PCT Pub. Date: Aug. 18, 2011

(65) Prior Publication Data
US 2012/0309323 A1    Dec. 6, 2012

(30) Foreign Application Priority Data
Feb. 12, 2010 (CN) .......................... 2010 1 0109491

(51) Int. Cl.
*H04B 17/00* (2006.01)
(52) U.S. Cl.
CPC ........ *H04B 17/0087* (2013.01); *H04B 17/0007* (2013.01); *H04B 17/008* (2013.01)
USPC .................................. 455/67.11; 455/67.12
(58) Field of Classification Search
USPC .......................................... 455/67.11, 67.12
See application file for complete search history.

(56) References Cited

U.S. PATENT DOCUMENTS

| 2006/0229020 A1* | 10/2006 | Mlinarsky et al. .......... 455/67.14 |
| 2008/0056340 A1* | 3/2008 | Foegelle ........................ 375/224 |
| 2009/0310501 A1* | 12/2009 | Catovic et al. ................ 370/252 |
| 2010/0203880 A1* | 8/2010 | Sotoudeh ...................... 455/423 |

FOREIGN PATENT DOCUMENTS

CN    101262284    9/2008

OTHER PUBLICATIONS

International Search Report for International Application No. PCT/CN2010/073908 mailed Nov. 25, 2010.
Unknown. MEMO—3GPP TSG-RAN4 Meeting #50b—"Practical MIMO OTA Testing." Spirent Communications. Mar. 27, 2009. (10 pages).

(Continued)

*Primary Examiner* — Yuwen Pan
*Assistant Examiner* — Xin Jia
(74) *Attorney, Agent, or Firm* — Merchant & Gould P.C.

(57) ABSTRACT

A method and system for over the air performance testing based on a multi-antenna system are disclosed. The method comprises: a branch device mapping path signals from a channel emulator to test antennas according to the set number of the combined sub-paths and sub-path mapping rule; the test antennas transmitting spatial signals according to the path signals from the branch device; and a device under test receiving the spatial signals; and an over the air performance analysis and display module analyzing and displaying the over the air performance of the device under test based on the spatial signals received by the device under test. The present invention implements the test of the over the air performance of a multi-antenna terminal.

14 Claims, 4 Drawing Sheets

(56) References Cited

OTHER PUBLICATIONS

Unknown. MEMO—3GPP TSG-RAN4 Meeting #51—"TP: Methodology for MIMO OTA TR" *Spirent Communications*. May 4-8, 2009. (6 pages).

Unknown. MEMO—3GPP TSG-RAN WG4#52—"Considerations on MIMO OTA methodology." *ZTE*. Aug. 28. (4 pages).

Unknown. "Introduction to OTA Testing of MIMO devices." *IEEE* 802.11-09/1194r0. Nov. 2009. (73 pages).

* cited by examiner

METHOD AND SYSTEM FOR SPATIAL RADIO-FREQUENCY PERFORMANCE TESTING BASED ON MULTIPLE-ANTENNA SYSTEM

This application is a National Stage Application of PCT/CN2010/073908, filed 12 Jun. 2010, which claims benefit of Serial No. 201010109491.5, filed 12 Feb. 2010 in China and which applications are incorporated herein by reference. To the extent appropriate, a claim of priority is made to each of the above disclosed applications.

TECHNICAL FIELD

The present invention relates to radio frequency testing technology, and more particularly, to a method and system for over the air performance testing based on a multi-antenna system.

BACKGROUND OF THE RELATED ART

With the development of modern industry, among various wireless communication products, only those with good transmitting and receiving performance can guarantee communication quality, that is, total radiated power (TRP) is required to be greater than a certain value and total radiated sensitivity (TRS) is required to be less than a certain value, and in other words, over the air (OTA) performance test index is required to be good.

In order to guarantee normal use of mobile terminals in a network, the Cellular Telecommunications Industry Association (CTIA) has made "*The test plan for mobile station OTA performance*". Currently, many operators require the over the air performance of mobile terminals entering into their networks to be tested according to CTIA standards, and the TRP and TRS to meet a certain limit value.

For traditional single-antenna systems and terminals, test of indexes such as TRP and TRS is performed in a traditional chamber. With industrialization of current LTE systems, the traditional single-antenna systems and devices will gradually transit to communication devices and communication terminals with Multiple Input Multiple Output (MIMO) multi-antenna technology. However, the over the air performance of multi-antenna terminals cannot be evaluated in the traditional chamber. Therefore, a testing solution where a new-type chamber is formed from new devices is required to be added on the basis of the traditional chamber to evaluate the over the air performance of MIMO systems and terminal antennas. However, test methods and processes for radio frequency indexes in multi-antenna systems have not yet been specified in the current international standards, thus, the present invention aims at providing a method and system for over the air performance testing in a multi-antenna system.

SUMMARY OF THE INVENTION

In view of this, a main object of the present invention is to provide a method and system for over the air performance testing based on a multi-antenna system so as to implement test of the over the air performance of a multi-antenna terminal.

In order to achieve the foregoing object, the technical scheme of the present invention is implemented as follows.

The present invention provides a method for over the air performance testing based on a multi-antenna system, wherein the number of combined sub-paths and a sub-path mapping rule are set, and the method comprises:

a channel emulator outputting path signals to a branch device according to signals input by a base station emulator;

the branch device mapping the path signals from the channel emulator to test antennas according to the set number of the combined sub-paths and sub-path mapping rule;

the test antennas transmitting spatial signals according to the path signals from the branch device; and a device under test receiving the spatial signals, and then an over the air performance analysis and display module analyzing and displaying the over the air performance of the device under test based on the spatial signals received by the device under test.

The number of the test antennas is equal to the number of paths of a channel model used by the channel emulator.

In the method, mapping the path signals from the channel emulator to the test antennas comprises combining the sub-paths of the path signals according to the set number of combined sub-paths, and mapping the combined sub-paths to the test antennas according to the set sub-path mapping rule.

In the method, the device under test is located in a central position of a full-anechoic absorption chamber, and the test antennas are located on a circumference centered around the device under test.

In the method, the over the air performance analysis and display module is implemented by a corresponding function module in a test instrument/meter; or the over the air performance analysis and display module is an individual device.

In the method, a corresponding relationship between the paths and test antennas is set, the number of the combined sub-paths is 3, and the sub-path mapping rule comprises: mapping sub-path signals with the strongest signal power in the sub-paths of a path to an antenna corresponding to the path, and mapping signals of the other two sub-paths to two antennas on both sides of the antenna corresponding to the path.

The present invention further provides a system for over the air performance testing based on a multi-antenna system comprising: a base station emulator, a channel emulator, a branch device, a full-anechoic absorption chamber, test antennas, a device under test and an over the air performance analysis and display module; wherein the base station emulator is configured to emulate transmitting signals of a base station to output to the channel emulator;

the channel emulator is configured to output path signals to the branch device according to the signals input by the base station emulator;

the branch device is configured to map the path signals from the channel emulator to the test antennas according to the preset number of combined sub-paths and sub-path mapping rule;

the test antennas located in the full-anechoic absorption chamber are configured to transmit spatial signals according to the path signals from the branch device;

the device under test is configured to receive the spatial signals sent by the test antennas; and the over the air performance analysis and display module is configured to analyze and display over the air performance of the device under test according to the spatial signals received by the device under test.

In the system, the number of the test antennas is equal to the number of output paths of a channel model used by the channel emulator.

In the system, the branch device mapping the path signals from the channel emulator to the test antennas comprises combining the sub-paths of the path signals according to the set number of combined sub-paths, and mapping the combined sub-paths to the test antennas according to the set sub-path mapping rule.

In the system, the device under test is located in a central position of a full-anechoic absorption chamber, and the test antennas are located on a circumference centered around the device under test.

In the system, the over the air performance analysis and display module is implemented by a corresponding function module in a test instrument/meter; or the over the air performance analysis and display module is an individual device.

Using the method and system for over the air performance testing based on the multi-antenna system in accordance with the present invention, the path signals output by the channel emulator are mapped to the test antennas according to the preset number of combined sub-paths and sub-path mapping rule, the test antennas transmit the spatial signals according to the mapped path signals, and the over the air performance of the device under test is analyzed and displayed according to the spatial signals received by the device under test, thereby implementing test of the over the air performance of the multi-antenna terminal.

PREFERRED EMBODIMENTS OF THE PRESENT INVENTION

The basic idea of the present invention is that the path signals output by the channel emulator are mapped to the test antennas according to the preset number of combined sub-paths and sub-path mapping rule, the test antennas transmit the spatial signals according to the mapped path signals, and the over the air performance of the device under test is analyzed and displayed according to the spatial signals received by the device under test, thereby implementing test of the over the air performance of the multi-antenna terminal.

Figure 1:
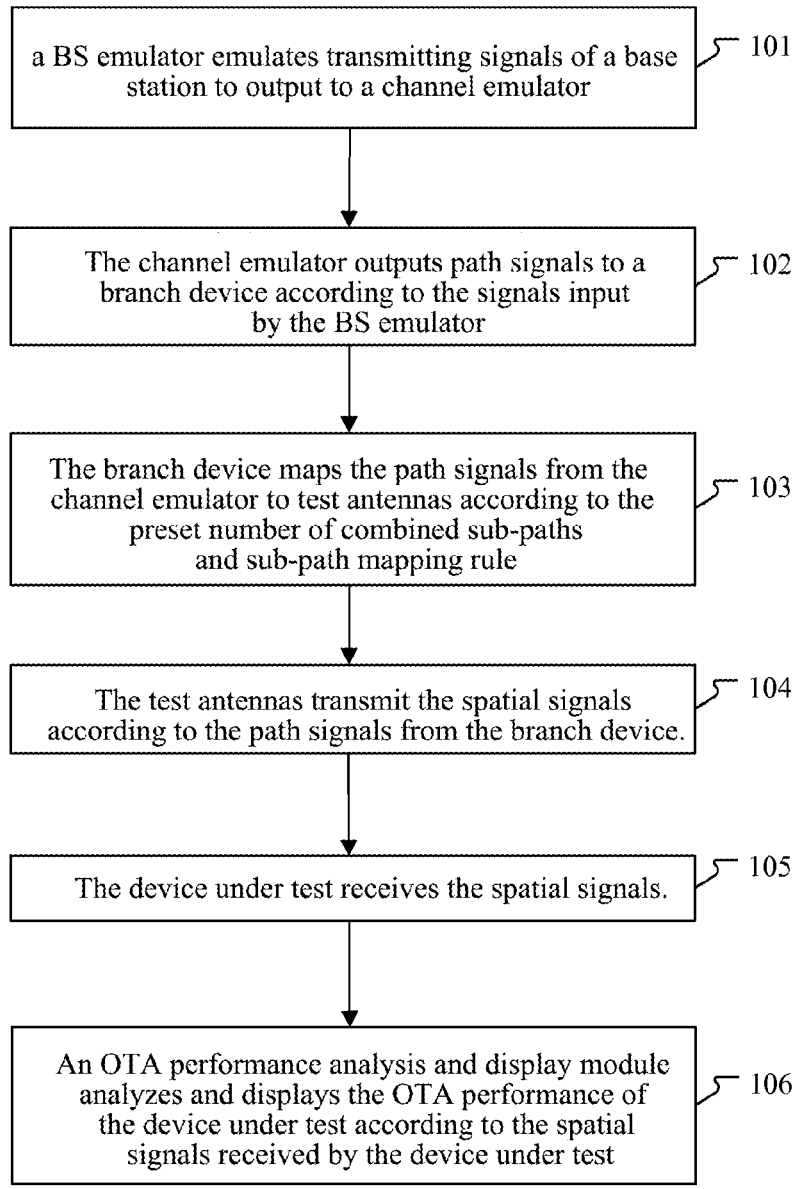
FIG. 1 is a flow diagram of a method for over the air performance testing based on a multi-antenna system according to the present invention.

FIG. 1 is a flow diagram of a method for over the air performance testing based on a multi-antenna system according to the present invention. As shown in FIG. 1, the method for over the air performance testing based on the multi-antenna system according to the present invention generally comprises following steps.

In step 101, a base station (BS) emulator emulates transmitting signals of a base station to output to a channel emulator.

For example, the BS emulator emulates the transmitting signals of the base station, and outputs M transmitting signals of the base station, i.e., the transmitting signals of M antennas of the base station.

In step 102, the channel emulator outputs path signals to a branch device according to the signals input by the BS emulator.

Here, M output signals of the BS emulator are input to the channel emulator so as to emulate the situation where base station signals passes through a spatial channel, the channel emulator outputs N signals, and the N signals are output to N test antennas in a chamber. The N signals output by the channel emulator are mapped to N test antennas according to a certain mapping relationship.

Assuming that the number of the test antennas in the chamber is N, where N should not be less than the number of paths (main paths and clusters) of a channel model used, a preferred value of the number of the test antennas is the number of the paths of the channel model. After the channel model used by the OTA is determined, the preferred value of the paths of the channel model should be determined. For example, the number of the paths of the channel model defined based on SCM, SCME and Winner I & II is 6 or 8, therefore, the preferred number N of single-polarized test antennas is 6 or 8. For the situation of dual polarization, two antennas in mutual cross-polarization, i.e., in V&H or inclined X cross-polarization, are configured in the same antenna position, and the preferred value of the number N of the required test antennas should be 6×2 or 8×2, i.e., 12 or 16, and the number of the test antennas may be equal to but not limited to this preferred value.

It should be noted that all the test antennas are located in a full-anechoic absorption chamber (such as an anechoic chamber and a wave absorption chamber), and that these test antennas are located in different positions in the full-anechoic absorption chamber and transmit signals using some time and spatial characteristics so as to test a multi-antenna device (terminal). Specifically, a device under test (DUT) is generally located in a central position of the full-anechoic absorption chamber, and the test antennas are located on a circumference centered around the DUT so as to guarantee that signals sent by each test antenna reach the DUT simultaneously. Thus, the DUT receives the signals from the space and processes the received signals, or, processes the signals after transmitted through cables and verifies the received signals, thereby completing the OTA test.

In step 103, the branch device maps the path signals from the channel emulator to test antennas according to the preset number of combined sub-paths and sub-path mapping rule.

According to the above description, the number of the test antennas in the chamber should not be less than (equal to or greater than) the number of the paths (i.e., main paths and clusters) of the channel model used, and the preferred value of the number of the test antennas is the number of the paths of the channel model, that is to say, the number N of the selected test antennas in normal use is the number of the paths of the channel model used. The subsequent mapping method given by the present invention is also based on this. Moreover, the signal mapping mode given by the present invention takes the situation of single-polarization as an example, the situation of dual-polarization is identical with the mapping mode of single-polarization, and the mapped signals are allocated to dual-polarized antennas located in the same position.

In the multi-antenna system of the present invention, each path is generally comprised of P sub-paths, the value of W is usually 20. Since there are too many sub-paths and the operation of signal mapping is too complicated, the sub-paths are required to be combined. The combination can be completed by adding sub-path channel matrix elements or adding vectors, and there are K sub-paths in each path after the combination, where the number K is required to be less than N, and the preferred value of K is 3, that is, after the sub-paths are combined, there are still N paths in total, and there are K sub-paths in each path.

The signals of path1 to pathN output from the channel emulator are output to the full-anechoic absorption chamber through cables, the number of the test antennas in the full-anechoic absorption chamber is N, and the test antennas corresponds to 6 paths respectively, that is, the antennas are in one-to-one correspondence with the paths. In addition, there are K sub-paths in the signals of each path, the K sub-paths are mapped to K antennas in the chamber respectively, the antenna corresponding to this path is included in the K antennas, and the test antennas transmit spatial signals in the chamber.

Figure 2:
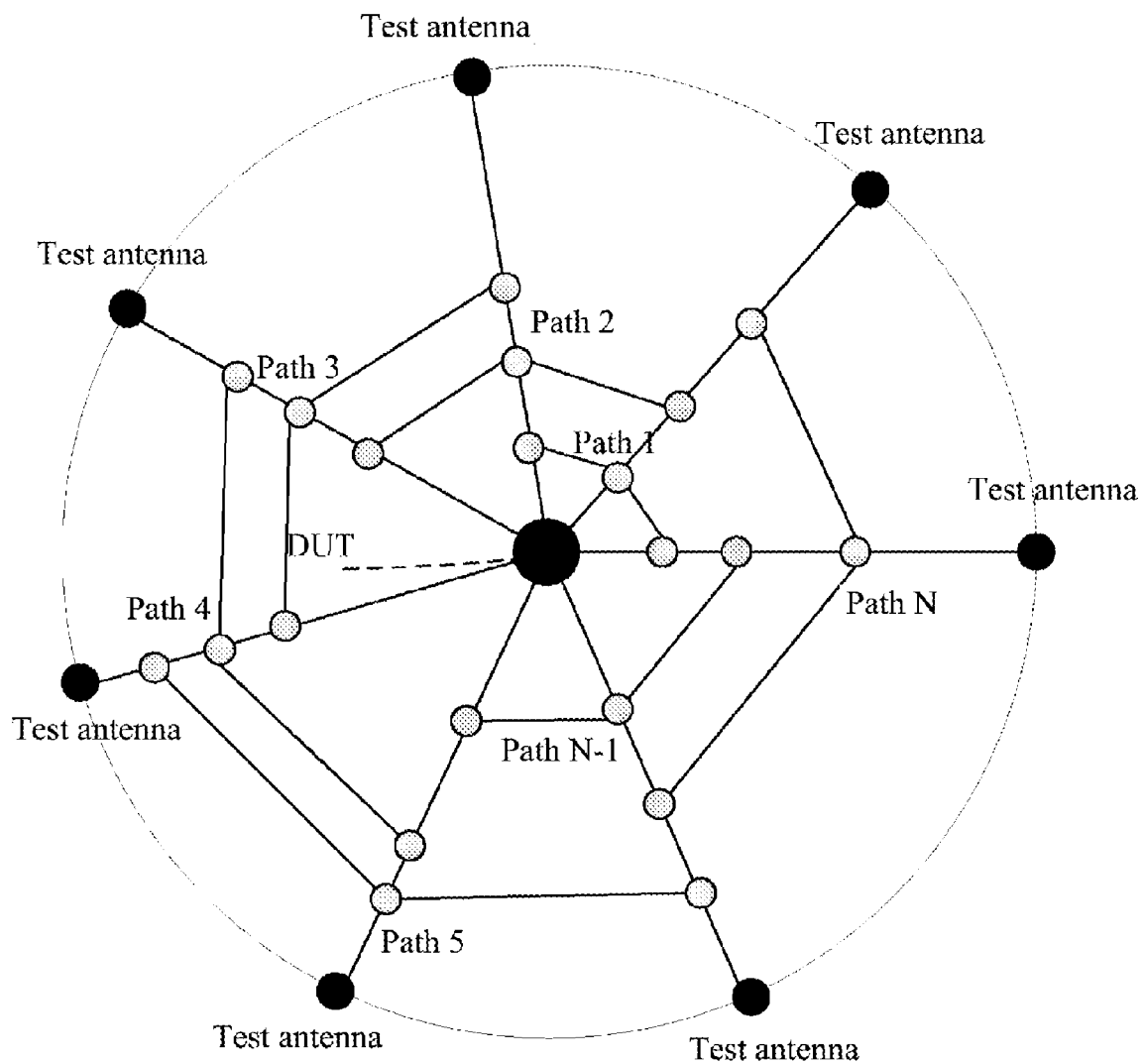
FIG. 2 is a schematic diagram of mapping of signals between paths and test antennas according to one embodiment of the present invention.

In the present invention, the number of the combined sub-paths and sub-path mapping rule are required to be preset. Mapping the path signals from the channel emulator to the test antennas comprises combining the sub-paths of the path signals according to the set number of the combined sub-paths, and then mapping the combined sub-paths to the test antennas according to the set sub-path mapping rule. For example, a corresponding relationship between the paths and test antennas is set, and in the case that the number K of the combined sub-paths is 3, each path after the combination of the sub-paths is comprised of 3 sub-paths, one sub-path with the strongest signal power in the 3 sub-paths is mapped to the antenna corresponding to this path, signals of the other two sub-paths are mapped to the other two antennas in the chamber. Generally, the signals of these two sub-paths will be mapped to two antennas on both sides of the antenna corresponding to this path, as shown in FIG. 2.

It should be noted that, the sub-path mapping rule may include various selection modes, such as a mode where a sub-path with the strongest signal power is mapped to an antenna corresponding to this path, and signals of the other two sub-paths are mapped to two antennas on both sides of the antenna corresponding to this path, as described in above embodiment, and a sequential determination mode.

In step 104, the test antennas transmit the spatial signals according to the path signals from the branch device.

In step 105, the device under test receives the spatial signals.

In step 106, an over the air performance analysis and display module analyzes and displays the over the air performance of the device under test according to the spatial signals received by the device under test.

Here, the DUT can receive the signals from the space, analyze the received signals, and then send analysis results to other devices for displaying, or the DUT can transmit the received signals through cables, and then the other devices analyze and display the signals, thereby completing the OTA test. In other words, the over the air performance analysis and display module sometimes needs to analyze performance indexes or only display performance. In practical applications, the over the air performance analysis and display module can be implemented by using a corresponding function module in a test instrument/meter directly, that is, the performance is analyzed and displayed using the test instrument/meter directly.

Figure 3:
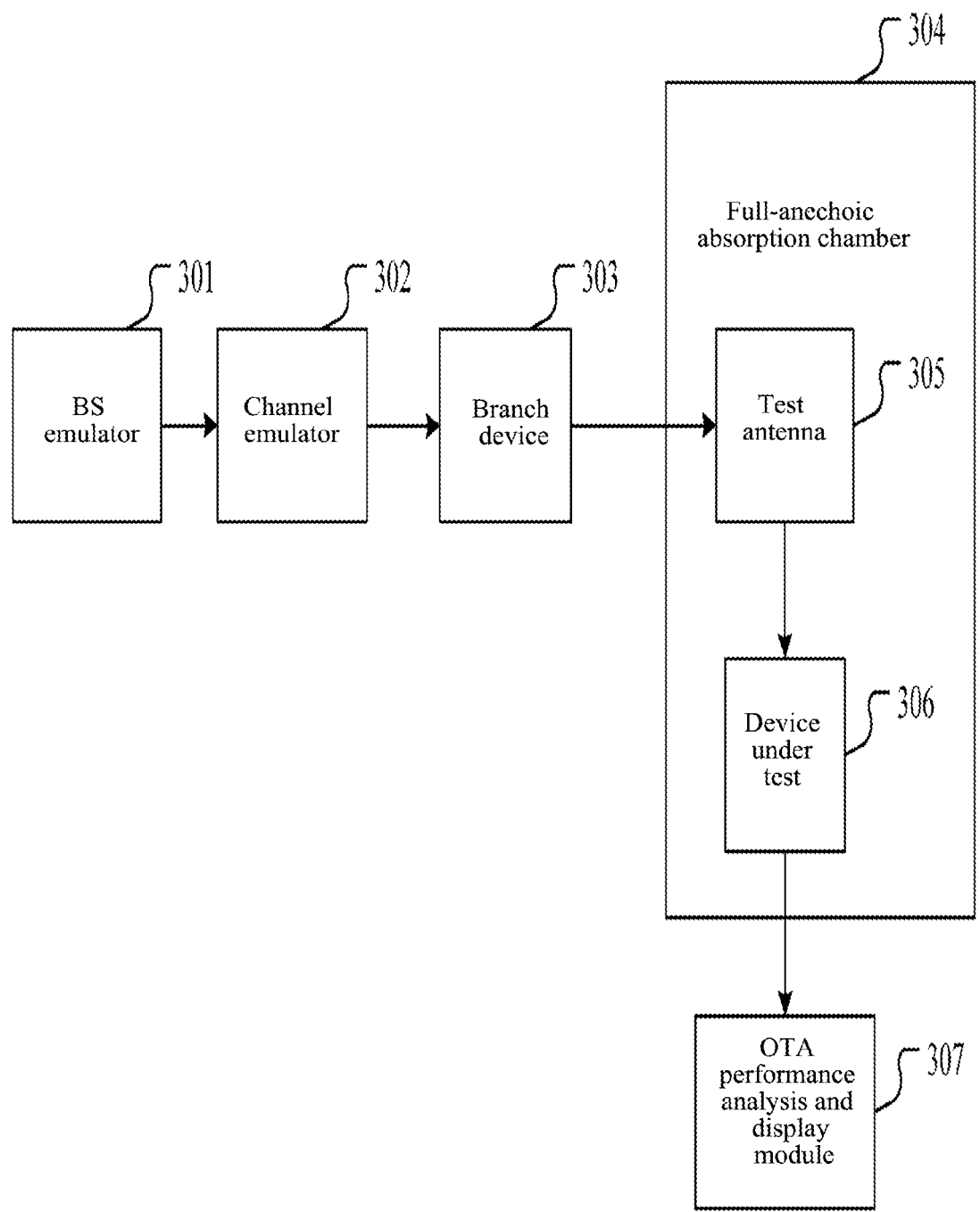
FIG. 3 is a block diagram of a system for over the air performance testing based on a multi-antenna system according to the present invention.

FIG. 3 is a schematic diagram of a structure of a system for over the air performance testing based on a multi-antenna system according to the present invention. As shown in FIG. 3, the system comprises a BS emulator 301, a channel emulator 302, a branch device 303, a full-anechoic absorption chamber 304, test antennas 305, a device under test 306 and an over the air performance analysis and display module 307.

The BS emulator 301 is configured to emulate transmitting signals of a base station to output to the channel emulator 302.

The channel emulator 302 is configured to output path signals to the branch device 303 according to the signals input by the base station emulator.

The branch device 303 is configured to map the path signals from the channel emulator to the test antennas 305 according to the preset number of combined sub-paths and sub-path mapping rule. Specifically, the path signals can be mapped to the corresponding test antennas using a mapping relationship similar to that shown in FIG. 2.

The test antennas 305 located in the full-anechoic absorption chamber 304 are configured to transmit spatial signals according to the path signals from the branch device.

The device under test 306 is configured to receive the spatial signals sent by the test antennas.

The over the air performance analysis and display module 307 is configured to analyze and display over the air performance of the device under test according to the spatial signals received by the device under test 306.

The number of the test antennas 305 is equal to the number of output paths of a channel model used by the channel emulator 302.

The branch device 303 mapping the path signals from the channel emulator 302 to the test antennas 305 comprises combining the sub-paths of the path signals according to the set number of combined sub-paths, and mapping the combined sub-paths to the test antennas according to the set sub-path mapping rule.

The device under test 306 is located in a central position of a full-anechoic absorption chamber 304, and the test antennas are located on a circumference centered around the device under test.

The over the air performance analysis and display module 307 can be implemented by a corresponding function module in a test instrument/meter, or can be located in an over the air performance test system as an individual device.

Figure 4:
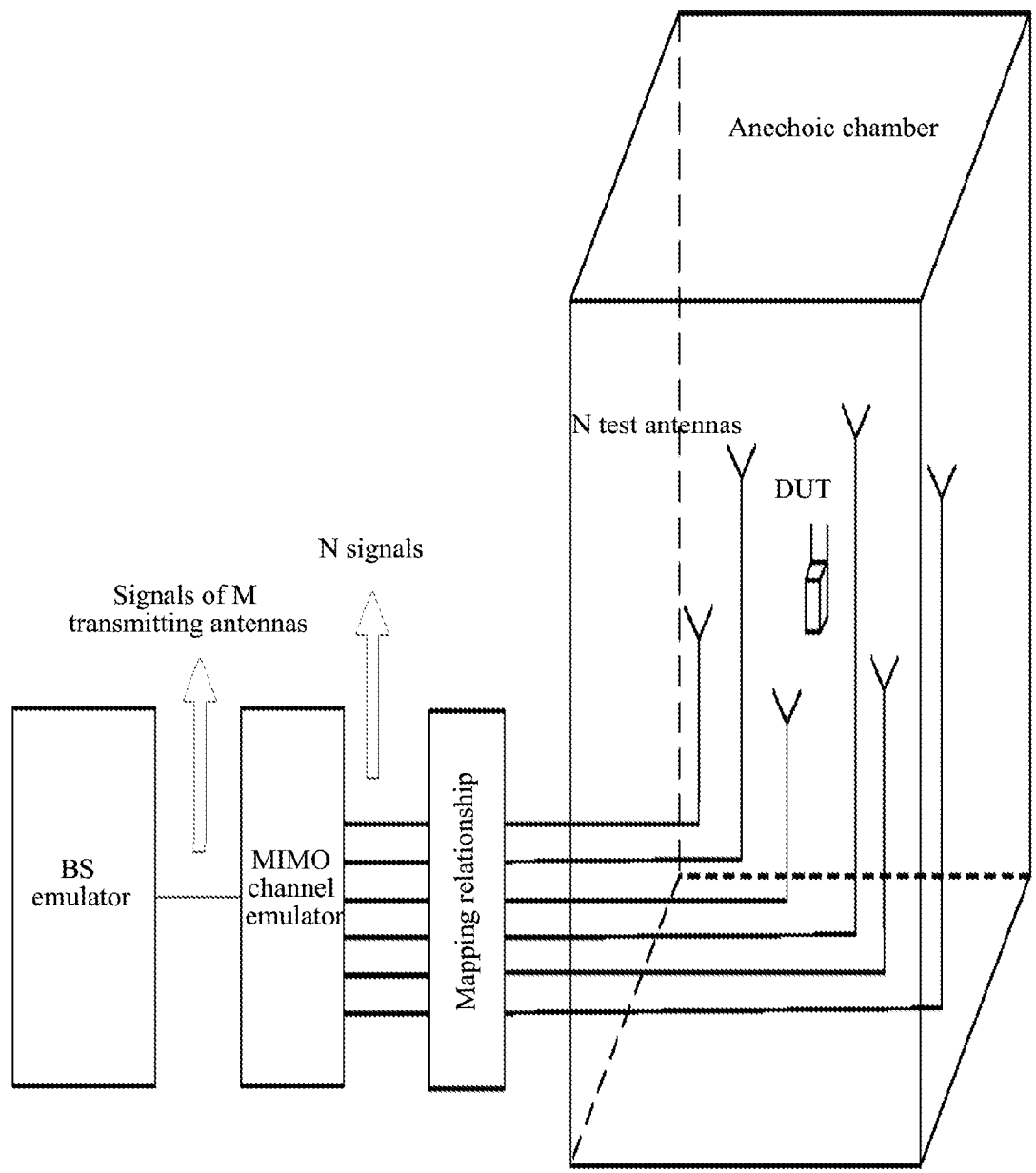
FIG. 4 is a schematic diagram of a structure of a system for over the air performance testing based on a multi-antenna system according to one embodiment of the present invention.

A system for over the air performance testing based on a multi-antenna system according to one embodiment of the present invention is as shown in FIG. 4.

It can be seen that the present invention provides a method and system for over the air performance testing based on a channel radio frequency emulator (channel emulator) and full-anechoic absorption chamber, and solves the problems of how to establish a test environment and implement the OTA test for the MIMO system (MIMO terminal), processing of the signals by the channel emulator and the relationship between the antennas and signals in the full-anechoic absorption chamber, thereby satisfying the MIMO OTA requirements effectively.

The above description is only the preferred embodiments of the present invention, and is not intended to limit the protection scope of the present invention.

What is claimed is:

1. A method for over the air performance testing based on a multi-antenna system, wherein the number of combined sub-paths and a sub-path mapping rule are set, and the method comprises:

a channel emulator outputting path signals to a branch device according to signals input by a base station emulator;

the branch device mapping combined sub-paths to test antennas according to the set number of the combined sub-paths and sub-path mapping rule, wherein the combining is performed by adding sub-path channel matrix elements or adding vectors; wherein a corresponding relationship between the paths and test antennas is set, the number of the combined sub-paths is three; and the sub-path mapping rule comprises: mapping sub-path signals with the strongest signal power in the sub-paths of a path to an antenna corresponding to the path, and mapping signals of the other two sub-paths to two antennas on both sides of the antenna corresponding to the path;

the test antennas transmitting spatial signals according to the path signals from the branch device; and a device under test receiving the spatial signals, and then an over the air performance analysis and display module analyzing and displaying the over the air performance of the device under test based on the spatial signals received by the device under test.

2. The method according to claim 1, wherein the number of the test antennas is equal to the number of paths of a channel model used by the channel emulator.

3. The method according to claim 1, wherein mapping the path signals from the channel emulator to the test antennas comprises combining the sub-paths of the path signals according to the set number of combined sub-paths, and mapping the combined sub-paths to the test antennas according to the set sub-path mapping rule.

4. The method according to claim 1, wherein the device under test is located in a central position of a full-anechoic absorption chamber, and the test antennas are located on a circumference centered around the device under test.

5. The method according to claim 1, wherein the over the air performance analysis and display module is implemented by a corresponding function module in a test instrument/meter; or the over the air performance analysis and display module is an individual device.

6. The method according to claim 2, wherein mapping the path signals from the channel emulator to the test antennas comprises combining the sub-paths of the path signals according to the set number of combined sub-paths, and mapping the combined sub-paths to the test antennas according to the set sub-path mapping rule.

7. The method according to claim 2, wherein the device under test is located in a central position of a full-anechoic absorption chamber, and the test antennas are located on a circumference centered around the device under test.

8. A system for over the air performance testing based on a multi-antenna system comprising: a base station emulator, a channel emulator, a branch device, a full anechoic absorption chamber, test antennas, a device under test and an over the air performance analysis and display module; wherein the base station emulator is configured to emulate transmitting signals of a base station to output to the channel emulator;

the branch device is configured to map combined sub-paths to the test antennas according to the preset number of combined sub-paths and sub-path mapping rule, wherein the combining is performed by adding sub-path channel matrix elements or adding vectors; wherein a corresponding relationship between the paths and test antennas is set, the number of the combined sub-paths is three, and the sub-path mapping rule comprises: mapping sub-path signals with the strongest signal power in the sub-paths of a path to an antenna corresponding to the path, and mapping signals of the other two sub-paths to two antennas on both sides of the antenna corresponding to the path;

the test antennas located in the full-anechoic absorption chamber are configured to transmit spatial signals according to the path signals from the branch device;

the device under test is configured to receive the spatial signals sent by the test antennas; and the over the air performance analysis and display module is configured to analyze and display over the air performance of the device under test according to the spatial signals received by the device under test.

9. The system according to claim 8, wherein the number of the test antennas is equal to the number of output paths of a channel model used by the channel emulator.

10. The system according to claim 8, wherein the branch device mapping the path signals from the channel emulator to the test antennas comprises combining the sub-paths of the path signals according to the set number of combined sub-paths, and mapping the combined sub-paths to the test antennas according to the set sub-path mapping rule.

11. The system according to claim 8, wherein the device under test is located in a central position of a full-anechoic absorption chamber, and the test antennas are located on a circumference centered around the device under test.

12. The system according to claim 8, wherein the over the air performance analysis and display module is implemented by a corresponding function module in a test instrument/meter; or the over the air performance analysis and display module is an individual device.

13. The system according to claim 9, wherein the branch device mapping the path signals from the channel emulator to the test antennas comprises combining the sub-paths of the path signals according to the set number of combined sub-paths, and mapping the combined sub-paths to the test antennas according to the set sub-path mapping rule.

14. The system according to claim 9, wherein the device under test is located in a central position of a full-anechoic absorption chamber, and the test antennas are located on a circumference centered around the device under test.

* * * * *